United States Patent
Li et al.

(10) Patent No.: US 10,049,250 B2
(45) Date of Patent: Aug. 14, 2018

(54) DOCUMENT DECODING SYSTEM AND METHOD FOR IMPROVED DECODING PERFORMANCE OF INDICIA READING TERMINAL

(71) Applicant: Hand Held Products, Inc., Fort Mill, SC (US)

(72) Inventors: Jingquan Li, Auburn, NY (US); Timothy P. Meier, Camillus, NY (US); Robert M. Hussey, Waxhaw, NC (US)

(73) Assignee: Hand Held Products, Inc, Fort Mill, SC (US)

( * ) Notice: Subject to any disclaimer, the term of this patent is extended or adjusted under 35 U.S.C. 154(b) by 0 days.

(21) Appl. No.: 14/817,311

(22) Filed: Aug. 4, 2015

(65) Prior Publication Data

US 2015/0339509 A1 Nov. 26, 2015

Related U.S. Application Data

(63) Continuation of application No. 12/751,430, filed on Mar. 31, 2010, now Pat. No. 9,104,934.

(51) Int. Cl.
*G06K 7/10* (2006.01)
*G06K 7/14* (2006.01)

(52) U.S. Cl.
CPC ......... *G06K 7/1447* (2013.01); *G06K 7/1443* (2013.01)

(58) Field of Classification Search
USPC .......................................... 235/454, 462.11
See application file for complete search history.

(56) References Cited

U.S. PATENT DOCUMENTS

| | | |
|---|---|---|
| 4,588,211 A | 5/1986 | Greene |
| 4,776,464 A | 10/1988 | Miller et al. |
| 4,832,204 A | 5/1989 | Handy et al. |
| 5,119,433 A | 6/1992 | Will |
| 5,120,940 A | 6/1992 | Willsie |
| 5,138,140 A | 8/1992 | Siemiatkowski et al. |
| 5,199,084 A | 3/1993 | Kishi et al. |
| 5,262,623 A | 11/1993 | Batterman et al. |
| 5,307,423 A | 4/1994 | Gupta et al. |
| 5,317,388 A | 5/1994 | Surka et al. |
| 5,331,151 A | 7/1994 | Cochran et al. |
| 5,410,141 A | 4/1995 | Koenck et al. |
| 5,413,383 A | 5/1995 | Laurash et al. |
| 5,414,251 A | 5/1995 | Durbin |
| 5,428,212 A | 6/1995 | Tani et al. |
| 5,471,533 A | 11/1995 | Wang et al. |

(Continued)

Primary Examiner — Rafferty Kelly
(74) Attorney, Agent, or Firm — Additon, Higgins & Pendleton, P.A.

(57) ABSTRACT

Embodiments of the present invention comprise an indicia reading terminal including operatively configured to interact with a storage module to store data, including location data, of a decodable indicia found in a captured document image. In one embodiment, the indicia reading terminal can be provided with one or more pre-stored information about the decodable indicia and/or the document. In another embodiment the indicia reading terminal can be provided with instructions and similarly operatively configured components that can identify information about the decodable indicia, store such information in a table, and utilize the tabulated data to process captured image data of subsequent documents.

20 Claims, 6 Drawing Sheets

(56) References Cited

U.S. PATENT DOCUMENTS

| | | | |
|---|---|---|---|
| 5,490,217 A | 2/1996 | Wang et al. | |
| 5,500,516 A | 3/1996 | Durbin | |
| 5,506,697 A | 4/1996 | Li et al. | |
| 5,519,200 A * | 5/1996 | Williams | G06K 19/02 235/487 |
| 5,617,481 A | 4/1997 | Nakamura | |
| 5,659,167 A | 8/1997 | Wang et al. | |
| 5,857,029 A | 1/1999 | Patel | |
| 6,070,805 A | 6/2000 | Kaufman et al. | |
| 6,129,278 A | 10/2000 | Wang et al. | |
| 6,201,901 B1 | 3/2001 | Zhou et al. | |
| 6,390,362 B1 | 5/2002 | Martin | |
| 6,493,110 B1 | 12/2002 | Roberts | |
| 6,561,428 B2 | 5/2003 | Meier et al. | |
| 6,616,039 B1 * | 9/2003 | Saporetti | G06K 7/10722 235/454 |
| 6,722,569 B2 | 4/2004 | Ehrhart et al. | |
| 6,834,807 B2 | 12/2004 | Ehrhart et al. | |
| 7,222,789 B2 | 5/2007 | Meier et al. | |
| 7,325,737 B2 | 2/2008 | Epshteyn et al. | |
| 8,079,524 B2 | 12/2011 | He et al. | |
| 8,292,183 B2 | 10/2012 | Li et al. | |
| 8,297,511 B2 | 10/2012 | Hawley et al. | |
| 8,308,069 B2 | 11/2012 | Barber et al. | |
| 8,381,984 B2 | 2/2013 | Li et al. | |
| 9,104,934 B2 | 8/2015 | Li et al. | |
| 2001/0035458 A1 | 11/2001 | Schum et al. | |
| 2002/0110283 A1 | 8/2002 | Fan et al. | |
| 2002/0128796 A1 | 9/2002 | Matsutani | |
| 2003/0034463 A1 | 2/2003 | Tullis | |
| 2004/0108382 A1 | 6/2004 | Schum et al. | |
| 2004/0155110 A1 | 8/2004 | Ehrhart et al. | |
| 2005/0023355 A1 | 2/2005 | Barrus | |
| 2005/0060059 A1 | 3/2005 | Klein et al. | |
| 2005/0067496 A1 | 3/2005 | Yen et al. | |
| 2005/0167504 A1 | 8/2005 | Meier et al. | |
| 2006/0071081 A1 | 4/2006 | Wang | |
| 2007/0077059 A1 | 4/2007 | Denouse et al. | |
| 2008/0105747 A1 | 5/2008 | Orlassino | |
| 2009/0022429 A1 * | 1/2009 | Longacre, Jr. | G06K 9/228 382/313 |
| 2009/0159684 A1 | 6/2009 | Barber et al. | |
| 2010/0149187 A1 | 6/2010 | Slavin et al. | |
| 2011/0240740 A1 | 10/2011 | Li et al. | |
| 2011/0240741 A1 | 10/2011 | Li et al. | |

* cited by examiner

DOCUMENT DECODING SYSTEM AND METHOD FOR IMPROVED DECODING PERFORMANCE OF INDICIA READING TERMINAL

CROSS-REFERENCE TO RELATED APPLICATION

The present application claims the benefit of U.S. patent application Ser. No. 12/751,430 for a Document Decoding System and Method for Improved Decoding Performance of Indicia Reading Terminal filed Mar. 31, 2010 (and published Oct. 6, 2011 as U.S. Patent Application Publication No. 2011/0240741), now U.S. Pat. No. 9,104,934. Each of the foregoing patent application, patent publication, and patent is hereby incorporated by reference in its entirety.

FIELD OF THE INVENTION

The present invention relates to indicia reading terminals, and more particularly, to embodiments of indicia reading terminal configured with modes for data manipulation and storage to improve processing time of image data having a high number of pixel count values.

BACKGROUND

Indicia reading terminals are available in multiple varieties. Well-known among the varieties is the gun style terminal as commonly seen at retail store checkout counters. Other terminals are also available that provide enhanced functions, have keyboards, and displays, and include advanced networking communication capabilities. All of these terminals can be used in myriad of applications, including warehouses where the decodable indicia (e.g., the bar codes) may be located at great distances away from the operator of the indicia reading terminal.

Many of these terminals utilize image sensors. These devices can decode information encoded in bar code symbols, and more particularly these devices can process with bar code decoding algorithms captured images of documents. The availability of higher density image sensor arrays such as arrays that have ever increasing numbers of pixels, however, has increased the numbers of pixel values that must be processed to obtain the information coded in, e.g., the bar code symbology. Although the greater number of pixel values generally provides image representations of higher resolution, such resolution comes at the cost of processing speed.

There is therefore a need for indicia reading terminals that are operatively configured to provide high resolution images, without substantially sacrificing processing time.

SUMMARY

As discussed in more detail below, there is provided indicia reading terminals with improved processing characteristics. Embodiments of such indicia reading terminals are operatively configured to identify and store particular characteristics of the documents being imaged. This feature can dispense with some processing steps, and as provided in the embodiments and examples discussed below, these processing steps can be related to the search, identification, and decoding of the decodable indicia in the captured document image.

In one embodiment, a system for decoding a decodable indicia on a document comprises an indicia reading terminal that has a two dimensional image sensor array extending along an image plane, said two dimensional image sensor array comprising a plurality of pixels, and an optical assembly for use in focusing imaging light rays onto the plurality of pixels of said two dimensional image sensor array. The terminal can also comprise a housing encapsulating the two dimensional image sensor array and the optical assembly. The system also comprises a memory having a zone for storing a data table comprising at least one record. The system further defined wherein the system is operative in a mode in which the system, in response to an operator initiated command, captures a frame of image data and processes the frame of image data for attempting to decode the decodable indicia, and wherein the system in the mode is operative to populate the records in the data table with information respecting one or more characteristics of the document. The system yet further defined wherein the characteristics of the document comprise a location of the decodable indicia relative to a document field within a frame of image data, wherein the system in the mode is operatively responsive to the records to reduce a decode time that defines the difference in a first decode time for a first document and a second decode time for a second document, and wherein the first document and the second document have the same document characteristic.

In another embodiment, a system for decoding a decodable indicia on a document comprises an indicia reading terminal that has a two dimensional image sensor array extending along an image plane, said two dimensional image sensor array comprising a plurality of pixels, and an optical assembly for use in focusing imaging light rays onto the plurality of pixels of said two dimensional image sensor array. The terminal can also comprise a housing encapsulating the two dimensional image sensor array and the optical assembly. The system also comprises an external server in communication with the indicia reading terminal, the external server being external to the terminal. The system further defined wherein the system is operative in a mode in which the system, in response to an operator initiated command, captures a frame of image data and processes the frame of image data for attempting to decode the decodable indicia, and wherein the system in the mode is operative to populate the records in the data table with information respecting one or more characteristics of the document. The system yet further defined wherein the characteristics of the document comprise a location of the decodable indicia relative to a document field within a frame of image data, wherein the system in the mode is operatively responsive to the records to reduce a decode time that defines the difference in a first decode time for a first document and a second decode time for a second document, and wherein the first document and the second document have the same document characteristic.

In yet another embodiment, a method for improving processing time of document image data captured with an indicia reading terminal, the document image data corresponding to a document with a decodable indicia. The method comprises a step for receiving an operator initiated command for capturing a frame of image data and processing the frame of image data for attempting to decode the decodable indicia. The method also comprises a step for defining a document field within the frame of image data, accessing a data table comprising at least one recording having information respecting a characteristic of the document so imaged, and attempting to decode the decodable indicia. The method further defined wherein the characteristic of the document comprises at least a location of the decodable indicia relative to the document field, and wherein the records reduce a decode time that defines the difference in a first decode time for a first document and a second decode time for a second document. The method still further defined wherein the first document and the second document have the same document characteristic.

BRIEF DESCRIPTION OF THE DRAWINGS

So that the manner in which the above recited features of the present invention can be understood in detail, a more particular description of the invention briefly summarized above, may be had by reference to the embodiments, some of which are illustrated in the accompanying drawings. It is to be noted, however, that the appended drawings illustrate only typical embodiments of this invention and are therefore not to be considered limiting of its scope, for the invention may admit to other equally effective embodiments. Moreover, the drawings are not necessarily to scale, emphasis generally being placed upon illustrating the principles of certain embodiments of invention.

Thus, for further understanding of the concepts of the invention, reference can be made to the following detailed description, read in connection with the drawings in which.

DETAILED DESCRIPTION OF THE INVENTION

In accordance with its major aspects, and broadly stated, the present invention is directed to a register, a terminal, or other hand held device, and systems comprising and integrating such hand held devices therein, configured to capture image data of a document. More particular to one embodiment of the invention there is provided in the discussion below examples of such indicia reading terminals that can identify certain contents of the captured document image data to improve the performance of the terminals such as by improving the decoding of decodable indicia located on the document. This content can comprise certain identifying characteristics of the decodable indicia such as its location with respect to the document and/or the captured document image data. This information can be utilized during operation of the terminal. This is particularly beneficial because embodiments of the terminal can be configured to learn, store, or otherwise retain certain information from which the terminal can execute further operations that utilize this stored information to identify documents and/or decode decodable indicia.

Figure 1:
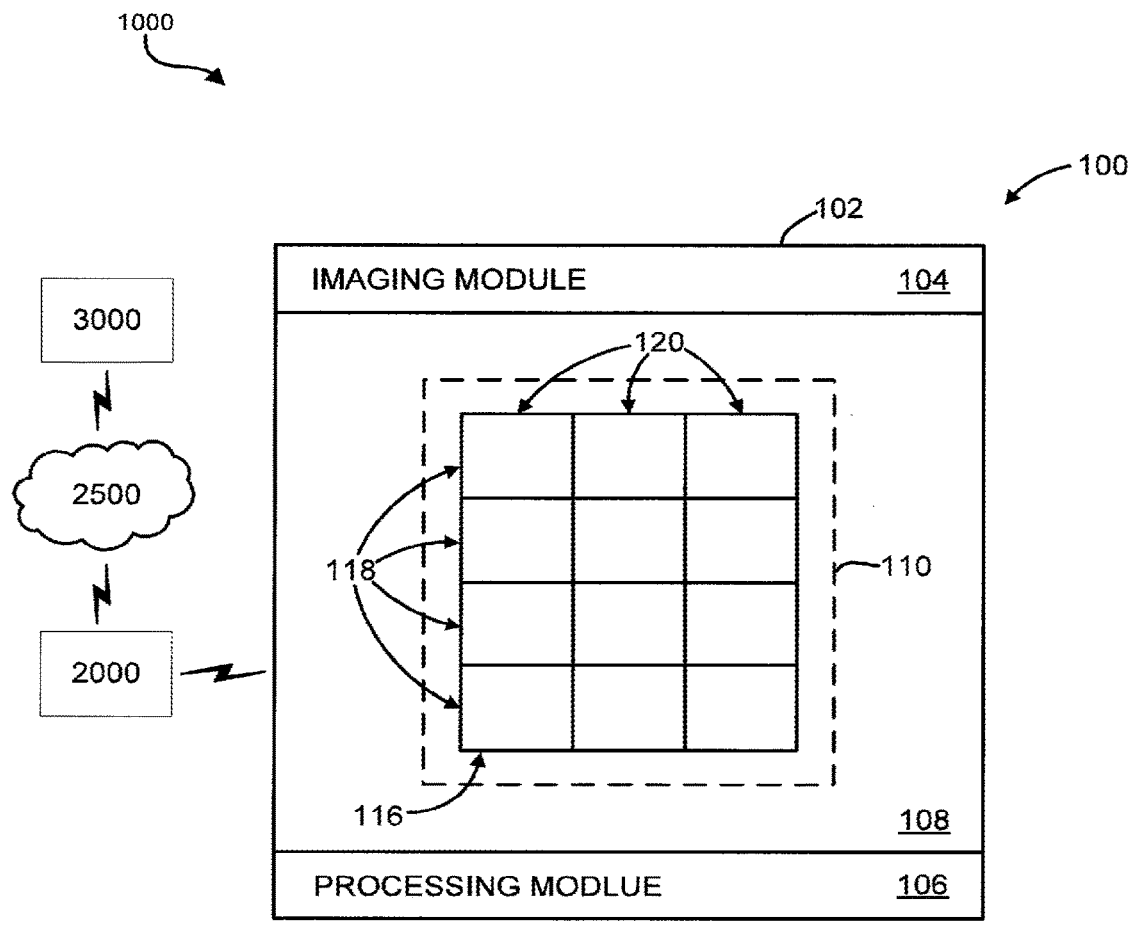
FIG. 1 is a schematic diagram of one example of an indicia reading terminal.
Figure 1:
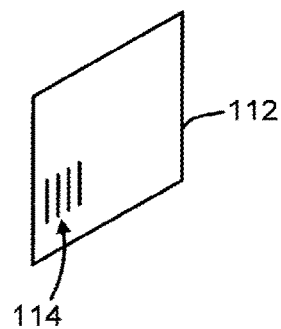

Referring now to FIG. 1, and continuing the discussion of the indicia reading terminals of the present invention, there is illustrated a schematic diagram of one embodiment of an indicia reading terminal 100. The indicia reading terminal 100 can comprise a device structure 102 with an imaging module 104, a processing module 106 such as a central processing unit ("CPU"), and a storage module 108 such as memory that has at least one zone 110 for storing certain contents such as information about a document 112, a decodable indicia 114, or any combination thereof. There are other components that can facilitate the capture of the document image data, some of which are discussed in more detail in connection with the indicia reading terminals illustrated in FIGS. 5-8 and described below.

The indicia reading terminal 100 can be part of a system 1000 having a local server 2000, a remote server 3000, and a network 2500 that couples the local server 2000 and the remote server 3000. This configuration of the system 1000 can be utilized for processing the captured document image data, and in one configuration one or more of the local server 2000 and the remote server 3000 is utilized to entirely process the captured document image data in a manner consistent with the disclosure below. In one embodiment, one or more of the processing module 106 and the storage module 108, or complementary ones thereof, can be located outside of the terminal 100 so as to permit data and information captured by the terminal 100 to be transferred from the terminal 100 to, e.g., the corresponding storage module 108 for immediate and/or further processing of the captured document image data. In another embodiment, image processing steps disclosed, described, and contemplated herein can be distributed as between the terminal 100, the local server 2000, and the remote server 3000, with still other embodiments being configured for the image processing steps to be executed entirely by the terminal 100.

Focusing first on the device structure 102, however, and the storage module 108 in particular, the zone 110 can be any type of storage medium consistent with, for example, read-only memory ("ROM") such as flash memory, and random access memory ("RAM"), as well as discrete devices such as PROMs, EEPROMs, and the like. By way of non-limiting example, the devices for use in the zone 110 can be configured to store the information in one or more data tables 116. These data tables 116 can comprise a plurality of records 118, each of which can have plurality of fields 120 for sorting the information located therein.

The inventors have determined that information stored as records 118 in the zone 110 can be utilized to optimize the performance of the indicia reading terminal 100. In one embodiment, this information can be document data with fields 120 that correspond to, but are not limited to, one or more of the document type, indicia type, indicia location, indicia size, and any combination thereof. This organization of the information in the table 116 is of course not limiting to the scope of the present disclosure, but rather utilized as an example to simplify and clarify the discussion herein.

Each of the records 118 can comprise information that sets forth a relative location of the decodable indicia such as the relative location of the decodable indicia with respect to the document ("the relative document location"), or the relative location of the decodable indicia with respect a feature of the document ("the relative feature location"). In one embodiment, the document is defined by an isolated portion of the image, or document image, which in the present example is representative of the location of the document within the portion of the image captured by the imaging module 104. This portion can comprise the document on which is located the decodable indicia. The relative document location and the relative feature location can be determined relative to the boundaries, features, and other aspects of this portion of the image. An example of this feature of embodiments of the indicia reading terminal 100 is provided in more detail below.

Concepts such as the relative document location and the relative feature location are more clearly illustrated with reference now to the illustration of FIG. 2. There is shown in this example that embodiments of the indicia reading terminal 100 (FIG. 1) can capture an image 200, and more particularly the image 200 can be captured within the field of view 202 of the imaging module 104 (FIG. 1). The image 200 can comprise an outer boundary 204 that defines an image field 206, in which there is located a document field 208 that defines a document image 210 with a document image boundary 212. The document image boundary 212 can define the location of a document 214 within the document field 208 such as by providing coordinates, numerical values, or other defining characteristics that can be used to discern the location of the document 214 among the image data captured within the field of view 202.

The document 214 can have a decodable indicia 216 located thereon, and in one example the document image 210 can comprise a decodable indicia image boundary 218 to describe the location and features of the decodable indicia 216. In one embodiment, this location is defined with respect to the boundaries of the field of view 202, while in other examples this location can be defined with respect to particular features captured as part of the image 200 and included within the field of view 202. The decodable indicia image boundary 218 can permit location of the decodable indicia 216 such as the relative document location and the relative feature location discussed above. In one example, the relative document location can be defined by the relationship of the document image boundary 212 and the decodable indicia image boundary 218. Likewise and in another example the relative feature location can be assigned particular values that define the relationship of the decodable image boundary 212 and any one of a variety of identified features within the field of view 202, the image field 206, the document field 208, and the document image boundary 212. Such identified features can comprise, but are not limited to, other decodable indicia, other documents, and other features within the field of view, among many others.

The identification and definition of one or more of the document image 210, the document image boundary 212, and the decodable indicia image boundary 218 can further effectuate processing of the image 200 to locate, identify, and process the document 214. The inventors have discovered, for example, that by quantifying the relationship between the document image boundary 212 and the decodable indicia image boundary 218 the information such as the relative document location and the relative feature location can be more effectively utilized to identify particular ones of the document 214. In one example, this information (e.g., the relative document location, the relative feature location) can be stored and tabulated as one or more records 118 of the table 116.

Figure 2:
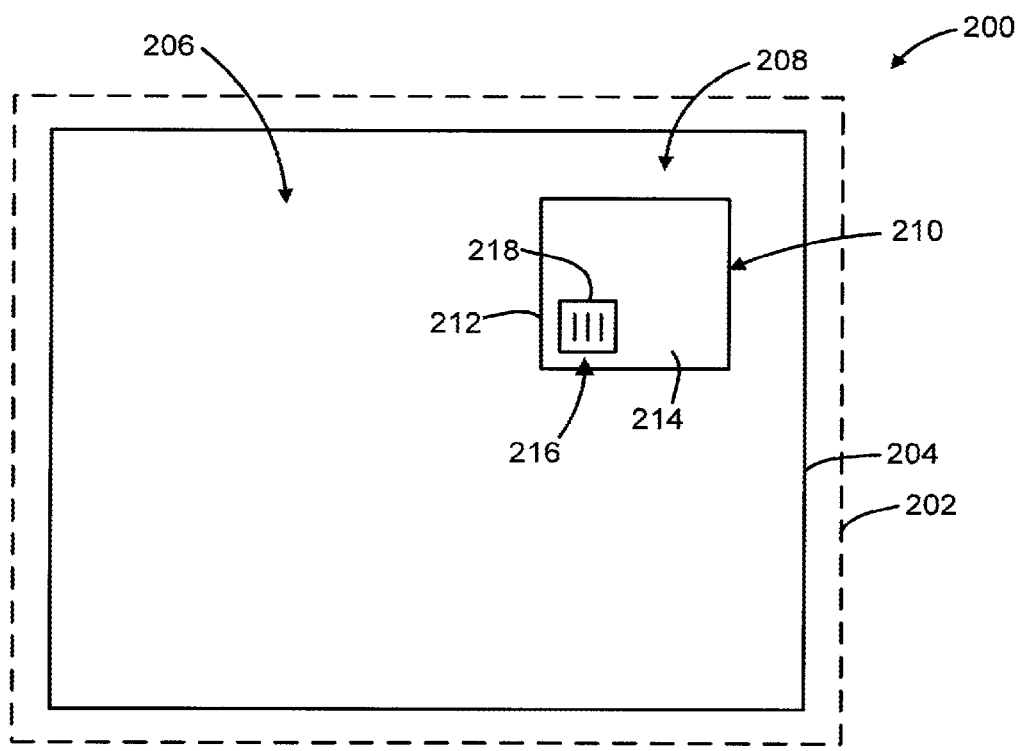
FIG. 2 is a schematic diagram of an image captured by embodiments of an indicia reading terminal, such as the indicia reading terminal of FIG. 1.

Referring back to FIG. 1, and also FIG. 2, there are various mechanisms and processes that can be used to populate the records 118 of the table 116. The information can be pre-loaded document data, which can be implemented on the device as part of e.g., manufacture and calibration processes for the indicia reading terminal 100. This pre-loaded document data can be configured based on known variables and computational characteristics related to, e.g., the field of view 202 (FIG. 2). In one example, these characteristics can include the dimensions such as the length and width of the field of view 202 (FIG. 2) so that the location of the document and/or the decodable indicia on the document can be more readily identified during processing of the image data that is captured by the imaging module 104.

In one implementation of the indicia reading terminal 100, the pre-loaded document data may be used to identify documents that are typically utilized during the normal course of business operations. Each of these documents may have one or more decodable indicia thereon, each of the decodable indicia being identified not only by its type and/or information stored therein but also by its location with respect to portions of the document. Thus in context of the present implementation, the table 116 may contain a number of records 118 that corresponds to each type of document, and the fields 120 for each of the records 118 may contain information such as the location of the decodable indicia that is used to distinguish each document type from the others that are used during operations. All of this information may be implemented on the indicia reading terminal 100 via, e.g., a computer interface or other user-implemented interface device that can transmit data to the indicia reading terminal 100, and more particular to the storage module 108.

Other implementations of the indicia reading terminal 100 may utilize instructions to store, transfer, and process captured image data such as executable instructions stored in memory or other computer-readable medium. These instructions can be executed by the processing module 106. The instructions can be used by the indicia reading terminal 100 to acquire and store document data in table 116 in response to, e.g., attempts to decode (and/or locate) the decodable indicia from the captured document image data. In one implementation of the indicia reading terminal 100, the instructions may permit operation of the indicia reading terminal 100 in a mode such as a training mode in which the imaged document and/or the information about the decodable indicia is automatically populated as one of the records 118 in the table 116. This training mode may be implemented at the time of the decode, such as in one implementation where one or more of the records is populated with data in response to a successful decode of the decodable indicia of the document. For additional details of the operation of terminals of the type used as the indicia reading terminal 100 reference can be had to the flow diagrams of FIGS. 3-4 and the corresponding discussion below.

The processing module 106 can be any type of CPU or microprocessor with exemplary functions designed to decode machine readable types of symbology, and particularly in connection with symbology found in the captured document image data. Decoding is a term used to describe the successful interpretation of machine readable indicia contained in an image captured by the imaging module 104. The code has data or information encoded therein. Information respecting various reference decode algorithms are available from various published standards, such as by the International Standards Organization ("ISO"). Examples may comprise one dimensional (or linear) symbologies, stacked symbologies, matrix symbologies, Composite symbologies, or other machine readable indicia. One dimensional (or linear) symbologies which may include very large to ultra-small, Code 128, Interleaved 2 of 5, Codabar, Code 93, Code 11, Code 39, UPC, EAN, MSI, or other linear symbologies. Stacked symbologies may include PDF, Code 16K, Code 49 or other stacked symbologies. Matrix symbologies may include Aztec, Datamatrix, Maxicode, QR Code or other 2D symbologies. Composite symbologies may include linear symbologies combined with stacked symbologies. Other symbology examples may comprise OCR-A, OCR-B, MICR types of symbologies. UPC/EAN symbology or barcodes are standardly used to mark retail products throughout North America, Europe and several other countries throughout the worlds.

Figure 3:
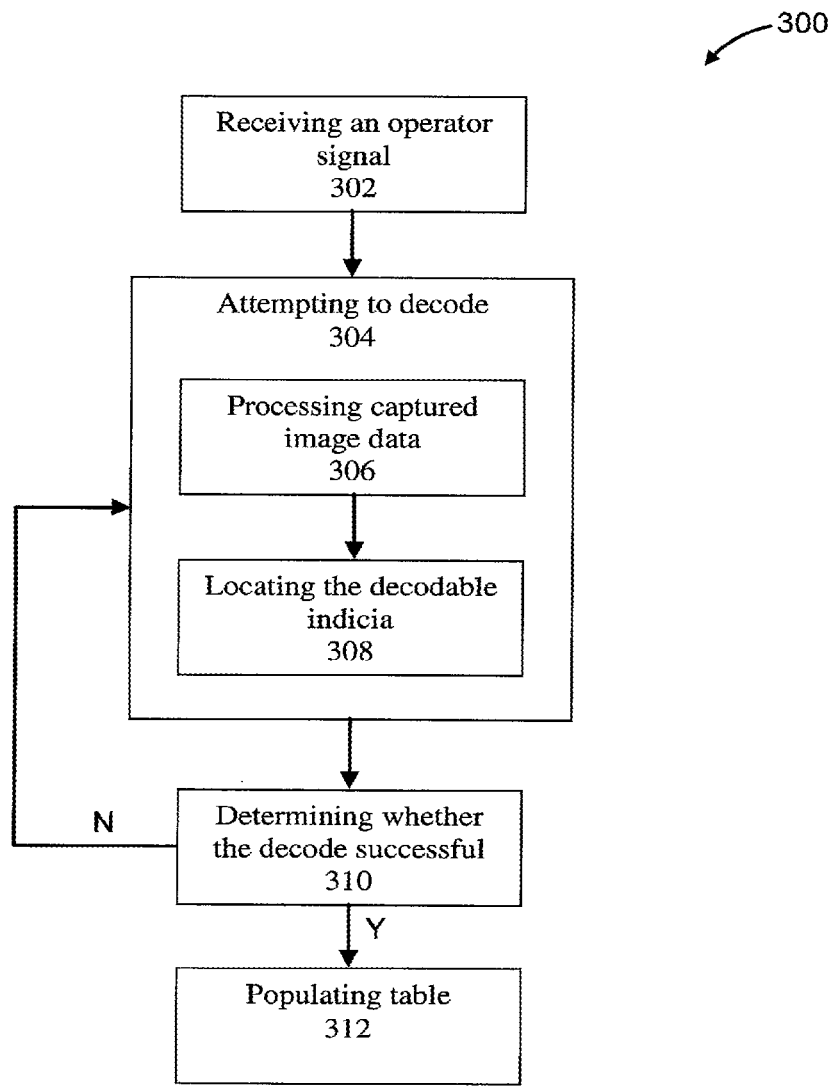
FIG. 3 is a flow diagram of one example of a method for decoding decodable indicia utilizing a data table.

Referring next to the flow diagram of FIG. 3, there is provided a method 300 for utilizing a data table such as the data table 116 (FIG. 1) discussed above. The method 300 can comprise, at step 302, receiving an operator signal to attempt to decode a decodable indicia. The step 302 can initiate a number of additional steps that can comprise at step 304 attempting to decode the decodable indicia, which can comprise at step 306 processing captured image data to define a document field within a field of view of, e.g., the indicia reading terminal 100 (FIG. 1), and a step 308 locating the decodable indicia relative to the document field. The method can also comprise at step 310 determining whether the decode was successful, and depending on the outcome of the decoding attempt (e.g., step 310), the method 300 can return to the step 308 to continue attempting to decode the decodable indicia. The method 300 can also comprise, in the event that the decodable indicia is successfully decoded, at step 312 populating a record in the table with information about the document.

Examples of certain types of information were discussed above so additional details are not provided herein. Moreover, one or more of the steps 302-312 can be done with or without utilizing a data table such as the data table 118 (FIG. 1). In one example, there may be no initial query of the data table in the case where there is no pre-loaded document data provided with the indicia reading terminal before implementation of, e.g., a first operator signal.

Figure 4:
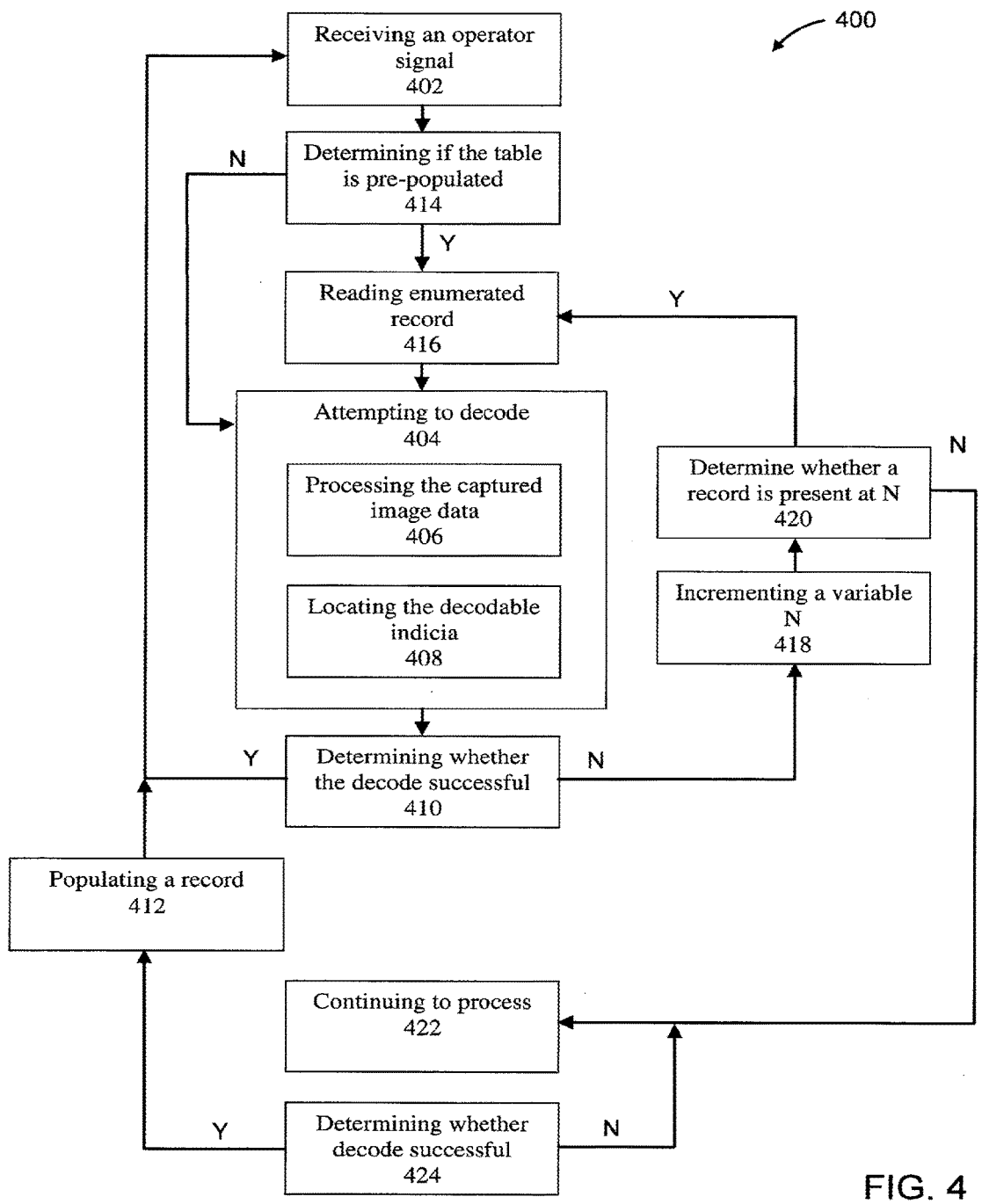
FIG. 4 is a flow diagram of another example of a method for decoding decodable indicia utilizing a data table.

A more detailed example of a method 400 for utilizing the data table can be had with reference to the flow diagram of FIG. 4. In this example, the method 400 can comprise a step 402 for receiving an operator signal to attempt to decode a decodable indicia, a step 404 for attempting to decode the decodable indicia, a step 406 for processing the captured image data, a step 408 for locating the decodable indicia, and a step 410 for determining whether the decode was successful. Moreover it is shown in FIG. 4 that the method 400 can also comprise a step 412 for populating a record in the table with information about the document.

The method 400 of the present example can further comprise at a step 414 determining whether the data table is pre-populate such as with the pre-loaded document data discussed above, a step 416 for reading an enumerated record in the table, a step 418 for incrementing a variable that identifies the enumerated record, a step 420 for determining whether a record is present at the enumerated record by the variable, a step 422 for continuing to process the document image data, and a step 424 for determining whether the decode was successful in connection with this continued processing mode. Details of these steps 402-424 are provided below.

The step 414 can be executed as a set of instructions that query the data table automatically, or in one alternative process the population of the data table with pre-loaded document data may also provide an indication that there is data present without requiring any specific query instruction. If there is no pre-populated data then the method 400 can advance to the step 404 and attempt to decode the decodable indicia. On the other hand, if there is pre-populated data in the data table, then the method 400 can execute the step 416 for reading the enumerated record (e.g., one of the records 118 (FIG. 1)) such as by assigning a value to a variable (e.g., N).

The method can advance to the step 404, mentioned above, and more particularly to the steps 406 and 408 in which occurs processing of the captured image data. In one embodiment, this processing can utilize the information stored in, e.g., the enumerated record (step 416). The steps 404 and 406 can utilize executable instructions that locate the document image within the field of view of the indicia reading terminal such as based on the information from the enumerated record. The steps 404 and 406 can likewise output the location as coordinates such as by identifying one or more corners, boundaries, or other identifying characteristics relative to the image, document, and the like. In one example, these identifying characteristics can provide a location that relates to the pixels of the document with respect to and/or relative to the remaining pixels of the captured image data in the field of view.

The variable N of step 418 can be used to identify any particular identifying feature of the records in the data table, such as by item number, reference number, column number, row number, etc. Such identification may be common among databases and database management systems, which are likewise considered as being proper locations for storing the information (and pre-loaded document data). In one example, the indicia reading terminal can communicate, e.g., via wired or wireless connection, to a central database in which is stored the various information respecting the documents, position of decodable indicia, and the like. The indicia reading terminal can communicate such as by downloading and uploading the information as part of one or more of the step 414, or as another step within the scope of the methods and devices disclosed herein. Moreover, the step 414 can be initiated if no successful decode is detected and/or if no data related to or indicative of a decodable indicia is present at, e.g., the location identified by the record in the data table corresponding.

When a record is present at the location corresponding to the value of the variable N, the method 400 can advance back to the step 416, as well as to the corresponding steps 404, 406, and 408. However, when such record is not present at the location in the data table identified by the variable N, the method 400 can execute the step 422 for continued processing of the captured document image data. This step 422 can include data processing steps not necessarily discussed herein, but contemplated as being executed so as to search for, identify, and or locate the position of anyone or more decodable indicia present on the document.

The steps can be executed, at least in part, as provided in the FIG. 4. For example, the present method 400 can execute the step 424 to determine whether the decode was successful in connection with this continued processing mode. A successful decode can then initiate the step 412 for recording a new record with the relevant information about the document and/or decodable indicia. This can include internal storage of the new record, as well as the communication of the indicia reading terminal with, e.g., the central database, to download the new record within the database and/or database management system.

Methods for locating features within a document representation, as well as numerous additional method and apparatus elements are set forth in U.S. application Ser. No. 12/751,493 filed on the filing date of the present application. The entirety of method and apparatus elements described in U.S. application Ser. No. 12/751,493 can be utilized with the method and apparatus elements set forth herein. U.S. application Ser. No. 12/751,493 is incorporated herein by reference.

Methods for locating features within a document representation, as well as numerous additional method and apparatus elements are set forth in U.S. application Ser. No. 12/751,560 filed on the filing date of the present application. The entirety of method and apparatus elements described in U.S. application Ser. No. 12/751,560 can be utilized with the method and apparatus elements set forth. U.S. application Ser. No. 12/751,560 is incorporated herein by reference.

Further details of indicia reading terminals such as the indicia reading terminal 100 of FIG. 1 are illustrated in FIGS. 5-8 and discussed in more detail below. There is provided in FIGS. 5 and 6, and described in more detail below, an example of an imaging module 500 for use as, e.g., the imaging 104 (FIG. 4). In one embodiment of the terminal 100, the imaging module 500 can comprise a focus element 502, and an image sensor integrated circuit 504 that is disposed on a printed circuit board 506 together with an illumination pattern light source bank 508, and aiming pattern light source bank 510. Here, each of the illumination bank 508, and the aiming bank 510 is provided as a single light source. The imaging module 500 can also include an optical plate 512 that has optics for shaping light from illumination bank 508, and the aiming bank 510 into predetermined patterns.

Figure 6:
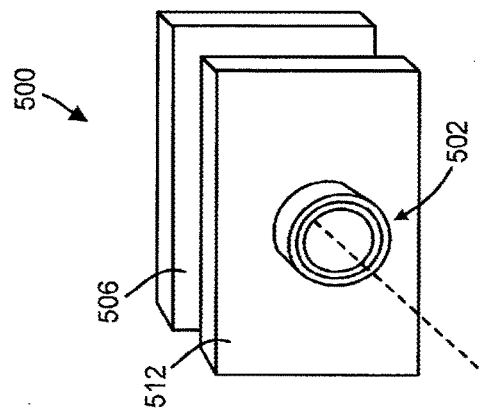
FIG. 6 is a perspective, assembled view of another example of an imaging module such as the imaging module of FIG. 5, for use in the indicia reading terminal of FIG. 1.
Figure 7:
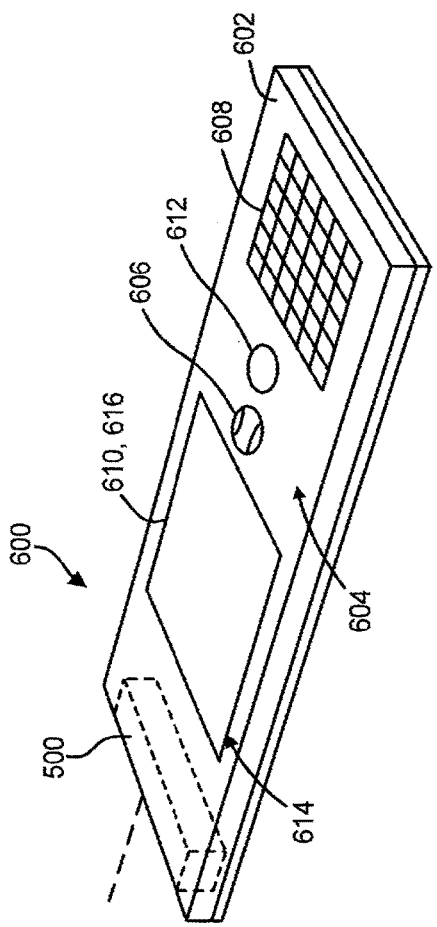
FIG. 7 is a perspective view of an indicia reading terminal incorporating an imaging module such as the imaging module of FIGS. 4 and 5.
Figure 5:
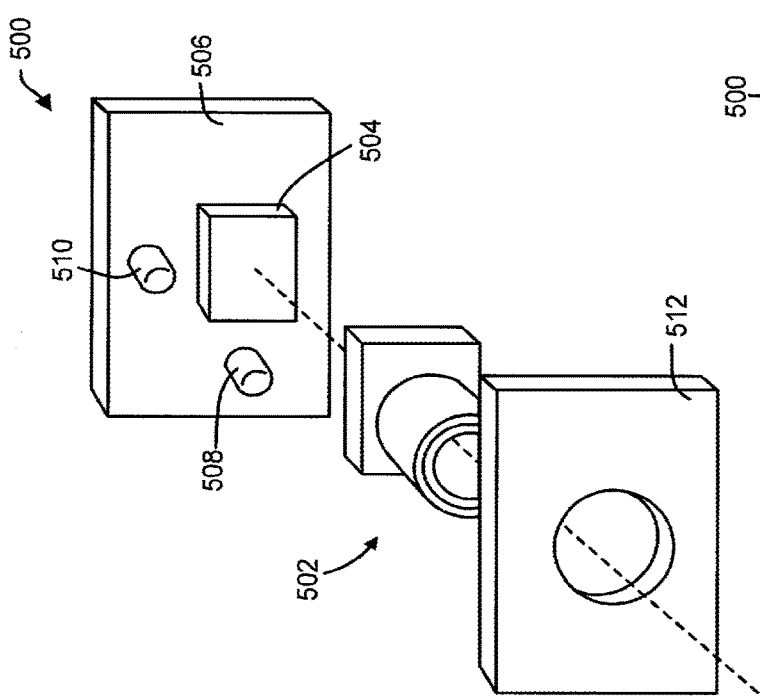
FIG. 5 is a perspective, exploded, assembly view of an example of an imaging module for use in the indicia reading terminal of FIG. 1.

Imaging module 500 can be disposed in the indicia reading terminals such as the indicia reading terminal 100 (FIG. 1) and the exemplary embodiment of an indicia reading terminal 600, which is shown in FIG. 6 and discussed next. The indicia reading terminal 600 can include a hand held housing 602 that supports a user input interface 604 with a pointer controller 606, a keyboard 608, a touch panel 610, and a trigger 612. The hand held housing 602 can also support a user output interface 614 with a display 616.

Exemplary devices that can be used for devices of the user input interface 602 are generally discussed immediately below. Each of these is implemented as part of, and often integrated into the hand held housing 602 so as to permit an operator to input one or more operator initiated commands. These commands may specify, and/or activate certain functions of the indicia reading terminal. They may also initiate certain ones of the applications, drivers, and other executable instructions so as to cause the indicia reading terminal 600 to operate in an operating mode.

Devices that are used for the point controller 606 are generally configured so as to translate the operator initiated command into motion of a virtual pointer provided by a graphical user interface ("GUI") of the operating system of the indicia reading terminal 600. It can include devices such as a thumbwheel, a roller ball, and a touch pad. In some other configurations, the devices may also include a mouse, or other auxiliary device that is connected, e.g., via wire, or wireless communication technology, to the indicia reading terminal 600.

Implementation of the keyboard 608 can be provided using one or more buttons, which are presented to the operator on the hand held housing 602. The touch panel 610 may supplement, or replace the buttons of the keyboard 608. For example, one of the GUIs of the operating system may be configured to provide one or more virtual icons for display on, e.g., the display 616, or as part of another display device on, or connected to the indicia reading terminal 600. Such virtual icons (e.g., buttons, and slide bars) are configured so that the operator can select them, e.g., by pressing or selecting the virtual icon with a stylus (not shown) or a finger (not shown).

The virtual icons can also be used to implement the trigger 612. On the other hand, other devices for use as the trigger 612 may be supported within, or as part of the hand held housing 602. These include, but are not limited to, a button, a switch, or a similar type of actionable hardware that can be incorporated into the embodiments of the indicia reading terminal 600. These can be used to activate one or more of the devices of the portable data terminal, such as the bar code reader discussed below.

Displays of the type suited for use on the indicia reading terminal 600 are generally configured to display images, data, and GUIs associated with the operating system and/or software (and related applications) of the indicia reading terminal 600. The displays can include, but are not limited to, LCD displays, plasma displays, LED displays, among many others and combinations thereof. Although preferred construction of the portable data terminal 600 will include devices that display data (e.g., images, and text) in color, the display that is selected for the display 616 may also display this data in monochrome (e.g., grayscale). It may also be desirable that the display 616 is configured to display the GUI, and in particular configurations of the indicia reading terminal 600 that display 616 may have an associated interactive overlay, like a touch screen overlay on touch screen 610. This permits the display 616 to be used as part the GUI so as to permit the operator to interact with the virtual icons, the buttons, and other implements of the GUI to initiate the operator initiated commands, e.g., by pressing on the display 616 and/or the touch screen 610 with the stylus (not shown) or finger (not shown).

The hand held housing 602 can be constructed so that it has a form, or "form factor" that can accommodate some, or all of the hardware and devices mentioned above, and discussed below. The form factor defines the overall configuration of the hand held housing 602. Suitable form factors that can be used for the hand held housing 602 include, but are not limited to, cell phones, mobile telephones, personal digital assistants ("PDA"), as well as other form factors that are sized and shaped to be held, cradled, and supported by the operator, e.g., in the operator's hand(s) as a gun-shaped device. One exemplary form factor is illustrated in the embodiment of the indicia reading terminal 600 that is illustrated in the present FIG. 7.

Figure 8:
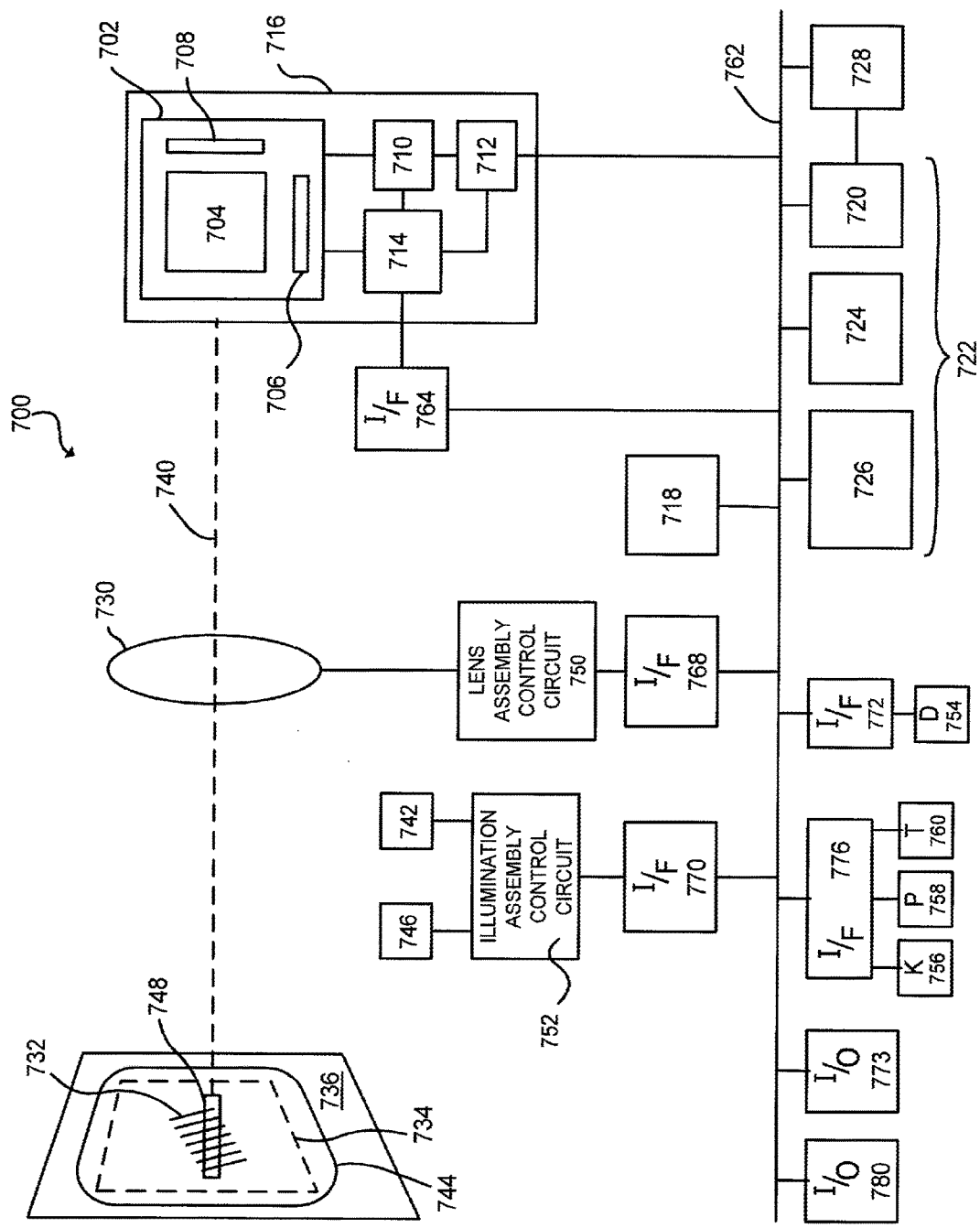
FIG. 8 is a block diagram of an exemplary hardware platform for implementation in an indicia reading terminal such as the indicia reading terminal of FIGS. 1 and 7.

An exemplary hardware platform for use in, e.g., the indicia reading terminal 100, 600, is illustrated and described with reference to the schematic block diagram of FIG. 8. In FIG. 8, it is seen that an indicia reading terminal 700 can include an image sensor 702 comprising a multiple pixel image sensor array 704 having pixels arranged in rows and columns of pixels, associated column circuitry 706 and row circuitry 708. Associated with the image sensor 702 can be amplifier circuitry 710, and an analog to digital converter 712 which converts image information in the form of analog signals read out of image sensor array 704 into image information in the form of digital signals. Image sensor 702 can also have an associated timing and control circuit 714 for use in controlling, e.g., the exposure period of image sensor 702, and/or gain applied to the amplifier 710. The noted circuit components 702, 710, 712, and 714 can be packaged into a common image sensor integrated circuit 716. In one example, image sensor integrated circuit 716 can be provided by an MT9V022 image sensor integrated circuit available from Micron Technology, Inc. In another example, image sensor integrated circuit 716 can incorporate a Bayer pattern filter. In such an embodiment, CPU 718 prior to subjecting a frame to further processing can interpolate pixel values intermediate of green pixel values for development of a monochrome frame of image data. In other embodiments, red, and/or blue pixel values can be utilized for the monochrome image data.

In the course of operation of terminal 700 image signals can be read out of image sensor 702, converted and stored into a system memory such as RAM 720. A memory 722 of terminal 700 can include RAM 720, a nonvolatile memory such as EPROM 724, and a storage memory device 726 such as may be provided by a flash memory or a hard drive memory. In one embodiment, terminal 700 can include CPU 718 which can be adapted to read out image data stored in memory 722 and subject such image data to various image processing algorithms. Terminal 700 can include a direct memory access unit (DMA) 728 for routing image information read out from image sensor 702 that has been subject to conversion to RAM 720. In another embodiment, terminal 700 can employ a system bus providing for bus arbitration mechanism (e.g., a PCI bus) thus eliminating the need for a central DMA controller. A skilled artisan would appreciate that other embodiments of the system bus architecture and/or direct memory access components providing for efficient data transfer between the image sensor 702 and RAM 720 are within the scope and the spirit of the invention.

Referring to further aspects of terminal 700, terminal 700 can include an imaging lens assembly 730 for focusing an image of a decodable indicia 732 located within a field of view 734 on a substrate 736 onto image sensor array 704. Imaging light rays can be transmitted about an optical axis 740. Lens assembly 730 can be adapted to be capable of multiple focal lengths and/or multiple best focus distances.

Terminal 700 can also include an illumination pattern light source bank 742 for generating an illumination pattern 744 substantially corresponding to the field of view 734 of terminal 700, and an aiming pattern light source bank 746 for generating an aiming pattern 748 on substrate 736. In use, terminal 700 can be oriented by an operator with respect to a substrate 736 bearing decodable indicia 732 in such manner that aiming pattern 748 is projected on a decodable indicia 732. In the example of FIG. 8, the decodable indicia 732 is provided by a 1D bar code symbol. Decodable indicia could also be provided by 2D bar code symbols, stacked linears, or optical character recognition (OCR) characters, etc.

Each of illumination pattern light source bank 742 and aiming pattern light source bank 746 can include one or more light sources. Lens assembly 730 can be controlled with use of lens assembly control circuit 750 and the illumination assembly comprising illumination pattern light source bank 742 and aiming pattern light source bank 746 can be controlled with use of illumination assembly control circuit 752. Lens assembly control circuit 750 can send signals to lens assembly 730, e.g., for changing a focal length and/or a best focus distance of lens assembly 730. This can include for example providing a signal to the piezoelectric actuator to change the position of the variable position element of the focus element discussed above. Illumination assembly control circuit 752 can send signals to illumination pattern light source bank 742, e.g., for changing a level of illumination output by illumination pattern light source bank 742.

Terminal 700 can also include a number of peripheral devices such as display 754 for displaying such information as image frames captured with use of terminal 700, keyboard 756, pointing device 758, and trigger 760 which may be used to make active signals for activating frame readout and/or certain decoding processes. Terminal 700 can be adapted so that activation of trigger 760 activates one such signal and initiates a decode attempt of the decodable indicia 732.

Terminal 700 can include various interface circuits for coupling several of the peripheral devices to system address/data bus (system bus) 762, for communication with CPU 718 also coupled to system bus 762. Terminal 700 can include interface circuit 764 for coupling image sensor timing and control circuit 714 to system bus 762, interface circuit 768 for coupling lens assembly control circuit 750 to system bus 762, interface circuit 770 for coupling illumination assembly control circuit 752 to system bus 762, interface circuit 772 for coupling display 754 to system bus 762, and interface circuit 776 for coupling keyboard 756, pointing device 758, and trigger 760 to system bus 762.

In a further aspect, terminal 700 can include one or more I/O interfaces 773, 780 for providing communication with external devices (e.g., a cash register server, a store server, an inventory facility server, a peer terminal 700, a local area network base station, a cellular base station). I/O interfaces 773, 780 can be interfaces of any combination of known computer interfaces, e.g., Ethernet (IEEE 802.3), USB, IEEE 802.11, Bluetooth, CDMA, GSM, IEEE 1394, RS232 or any other computer interface.

It is contemplated that numerical values, as well as other values that are recited herein are modified by the term "about", whether expressly stated or inherently derived by the discussion of the present disclosure. As used herein, the term "about" defines the numerical boundaries of the modified values so as to include, but not be limited to, tolerances and values up to, and including the numerical value so modified. That is, numerical values can include the actual value that is expressly stated, as well as other values that are, or can be, the decimal, fractional, or other multiple of the actual value indicated, and/or described in the disclosure.

While the present invention has been particularly shown and described with reference to certain exemplary embodiments, it will be understood by one skilled in the art that various changes in detail may be effected therein without departing from the spirit and scope of the invention as defined by claims that can be supported by the written description and drawings. Further, where exemplary embodiments are described with reference to a certain number of elements it will be understood that the exemplary embodiments can be practiced utilizing either less than or more than the certain number of elements.

The invention claimed is:

1. A system, comprising:
    an indicia reading terminal comprising an image sensor and an optical assembly for focusing light onto the image sensor; and
    a memory in communication with the indicia reading terminal, the memory having a zone for storing a data table comprising records;
    wherein the system is operative in a mode in which the system:
        in response to an operator-initiated command, captures a frame of image data and processes the frame of image data for attempting to decode a decodable indicia on a document;
        determines positional location data of the decodable indicia relative to positional location data of a separate document feature within the frame of image data, comprising the system being operative to locate both the decodable indicia and the separate document feature within the frame of image data;

populates the records in the data table with information respecting one or more characteristics of the document, wherein the characteristics of the document comprise the positional location data of the decodable indicia relative to the positional location data of the separate document feature within the frame of image data; and in response to the records, reduces a decode time that defines the difference in a first decode time for a first document and a second decode time for a second document, wherein the first document and the second document have the same document characteristic.

2. The system according to claim 1, wherein the document characteristic comprises positional location data of the decodable indicia with respect to the separate document feature.

3. The system according to claim 1, wherein the system in the mode is operative to identify records in the data table comprising one or more pre-populated document data items.

4. The system according to claim 1, wherein the data table comprises one or more pre-populated data items respecting the first document and the second document.

5. The system according to claim 1, wherein the data table comprises at least one data field that identifies (i) the type of decodable indicia, (ii) the location of the decodable indicia, and/or (iii) the size of the decodable indicia.

6. The system according to claim 1, wherein the separate document feature is defined by a document image boundary, wherein the decodable indicia comprises a decodable indicia boundary within the document image boundary, and wherein the positional location data of the decodable indicia is defined by the relationship of the decodable indicia boundary relative to the document image boundary.

7. The system according to claim 1, comprising a trigger for initiating the operator-initiated command.

8. A system, comprising:

an indicia reading terminal comprising an image sensor and an optical assembly for focusing light onto the image sensor; and an external server in communication with the indicia reading terminal, wherein the external server is external to the indicia reading terminal, and wherein the external server comprises memory having a zone for storing a data table comprising records;

wherein the system is operative in a mode in which the system:

in response to an operator-initiated command, captures a frame of image data and processes the frame of image data for attempting to decode a decodable indicia on a document;

determines positional location data of the decodable indicia relative to positional location data of a separate document feature within the frame of image data, comprising the system being operative to locate both the decodable indicia and the separate document feature within the frame of image data;

populates the records in the data table with information respecting one or more characteristics of the document, wherein the characteristics of the document comprise the positional location data of the decodable indicia relative to the positional location data of the separate document feature within the frame of image data; and in response to the records, reduces a decode time that defines the difference in a first decode time for a first document and a second decode time for a second document, wherein the first document and the second document have the same document characteristic.

9. The system according to claim 8, wherein the document characteristic comprises positional location data of the decodable indicia with respect to the separate document feature.

10. The system according to claim 8, wherein the system in the mode is operative to identify records in the data table comprising one or more pre-populated document data items.

11. The system according to claim 8, wherein the data table comprises one or more pre-populated data items respecting the first document and the second document.

12. The system according to claim 8, wherein the data table comprises at least one data field that identifies (i) the type of decodable indicia, (ii) the location of the decodable indicia, and/or (iii) the size of the decodable indicia.

13. The system according to claim 8, wherein the separate document feature is defined by a document image boundary, wherein the decodable indicia comprises a decodable indicia boundary within the document image boundary, and wherein the positional location data of the decodable indicia is defined by the relationship of the decodable indicia boundary relative to the document image boundary.

14. An indicia reading terminal, comprising:

an image sensor;

an optical assembly for focusing light onto the image sensor;

a memory for storing a data table comprising records;

a processing module in communication with the image sensor and the memory; and a housing encapsulating the image sensor, the memory, and the processing module;

wherein the indicia reading terminal is operative in a mode in which the indicia reading terminal:

in response to an operator-initiated command, captures a frame of image data and processes the frame of image data for attempting to decode a decodable indicia on a document;

determines positional location data of the decodable indicia relative to positional location data of a separate document feature within the frame of image data, comprising the system being operative to locate both the decodable indicia and the separate document feature within the frame of image data;

populates the records in the data table with information respecting one or more characteristics of the document, wherein the characteristics of the document comprise the positional location data of the decodable indicia relative to the positional location data of the separate document feature within the frame of image data; and in response to the records, reduces a decode time that defines the difference in a first decode time for a first document and a second decode time for a second document, wherein the first document and the second document have the same document characteristic.

15. The indicia reading terminal according to claim 14, wherein the document characteristic comprises positional location data of the decodable indicia with respect to the separate document feature.

16. The indicia reading terminal according to claim 14, wherein the indicia reading terminal in the mode is operative to identify records in the data table comprising one or more pre-populated document data items.

17. The indicia reading terminal according to claim 14, wherein the data table comprises one or more pre-populated data items respecting the first document and the second document.

18. The indicia reading terminal according to claim 14, wherein the data table comprises at least one data field that identifies (i) the type of decodable indicia, (ii) the location of the decodable indicia, and/or (iii) the size of the decodable indicia.

19. The indicia reading terminal according to claim 14, wherein the separate document feature is defined by a document image boundary, wherein the decodable indicia comprises a decodable indicia boundary within the document image boundary, and wherein the positional location data of the decodable indicia is defined by the relationship of the decodable indicia boundary relative to the document image boundary.

20. The indicia reading terminal according to claim 14, comprising a trigger for initiating the operator-initiated command.

* * * * *